United States Patent
Kubota et al.

(10) Patent No.: US 9,439,088 B2
(45) Date of Patent: Sep. 6, 2016

(54) METHODS, APPARATUS AND COMPUTER PROGRAMS FOR OPERATING A RADIO ACCESS NETWORK AND USER EQUIPMENT

(71) Applicant: Broadcom Corporation, Irvine, CA (US)

(72) Inventors: Keiichi Kubota, Weybridge (GB); Brian Alexander Martin, Weybridge (GB); Himanshu Kumar, Fleet (GB)

(73) Assignee: BROADCOM CORPORATION, Irvine, CA (US)

( * ) Notice: Subject to any disclaimer, the term of this patent is extended or adjusted under 35 U.S.C. 154(b) by 107 days.

(21) Appl. No.: 14/273,086

(22) Filed: May 8, 2014

(65) Prior Publication Data
US 2014/0334319 A1    Nov. 13, 2014

(30) Foreign Application Priority Data

May 10, 2013  (GB) .................................. 1308448.8

(51) Int. Cl.
*H04W 24/08* (2009.01)
*H04W 24/10* (2009.01)
(Continued)

(52) U.S. Cl.
CPC ............. *H04W 24/08* (2013.01); *H04W 24/10* (2013.01); *H04W 28/06* (2013.01); *H04W 28/18* (2013.01)

(58) Field of Classification Search
CPC .... H04W 24/08; H04W 28/06; H04W 28/18
USPC ......................................................... 370/252
See application file for complete search history.

(56) References Cited

U.S. PATENT DOCUMENTS

2003/0103470 A1* 6/2003 Yafuso .................. H04L 1/0001
                                                        370/282
2004/0022213 A1* 2/2004 Choi ..................... H04W 24/10
                                                        370/332
(Continued)

FOREIGN PATENT DOCUMENTS

WO        2011109647        9/2011

OTHER PUBLICATIONS

RP-122019; 3GPP TSG Meeting #58; Barcelona, Spain, Dec. 4-7, 2012; Ericsson; New Study Item proposal: Study on Further EUL Enhancements Approval. (6 pages).
(Continued)

*Primary Examiner* — Chi H Pham
*Assistant Examiner* — Robert Lopata
(74) *Attorney, Agent, or Firm* — Oblon, McClelland, Maier & Neustadt, L.L.P.

(57) ABSTRACT

A user equipment (UE) is configured with a first configuration for reporting measurement feedback information according to a first reporting cycle using a first set of parameters, and a second configuration for reporting measurement feedback information according to a second reporting cycle using a second set of parameters. The UE switches between the first cycle and the second cycle for reporting for example CQI based on for example comparing a data or a channel measurement against a predefined threshold. In various embodiments the second configuration is fixed, or results in no CQI reporting, or is variable based on a previous cycle or CQI level, or is event-based. In another embodiment, the network commands the UE to switch. The end result is that control signalling overhead can be reduced when appropriate by reducing the number of CQI reports that are sent uplink.

20 Claims, 10 Drawing Sheets

(51) Int. Cl.
*H04W 28/06* (2009.01)
*H04W 28/18* (2009.01)

(56) References Cited

U.S. PATENT DOCUMENTS

| | | | | |
|---|---|---|---|---|
| 2007/0047502 A1* | 3/2007 | Marinier | ............... | H04L 1/0026 370/335 |
| 2007/0218917 A1* | 9/2007 | Frederiksen | ........ | H04W 72/085 455/450 |
| 2008/0045228 A1* | 2/2008 | Zhang | .................. | H04L 1/0015 455/450 |
| 2008/0084844 A1* | 4/2008 | Reznik | ................. | H04L 1/0025 370/330 |
| 2009/0163199 A1* | 6/2009 | Kazmi | ................. | H04L 1/0026 455/425 |
| 2010/0061258 A1 | 3/2010 | Seo et al. | | |
| 2010/0113057 A1* | 5/2010 | Englund | ............... | H04L 1/0026 455/452.1 |
| 2010/0202306 A1* | 8/2010 | Jersenius | .......... | H04B 17/0067 370/252 |
| 2011/0007643 A1* | 1/2011 | Liang | .................... | H04L 5/0053 370/252 |
| 2011/0105171 A1* | 5/2011 | Luschi | ................. | H04L 5/0007 455/513 |
| 2011/0317614 A1* | 12/2011 | Park | ...................... | H04B 7/155 370/315 |
| 2012/0243486 A1* | 9/2012 | Zeira | ................... | H04B 7/0417 370/329 |
| 2012/0257568 A1* | 10/2012 | Cai | ...................... | H04L 1/1614 370/328 |
| 2013/0114428 A1* | 5/2013 | Koivisto | ............... | H04B 7/024 370/252 |
| 2013/0308542 A1* | 11/2013 | Kang | .................... | H04B 7/024 370/328 |
| 2014/0086084 A1* | 3/2014 | Bi | ........................ | H04L 1/0026 370/252 |
| 2014/0112186 A1* | 4/2014 | Fan | ...................... | H04L 1/1685 370/252 |
| 2014/0211684 A1* | 7/2014 | Liu | ....................... | H04B 7/024 370/312 |
| 2014/0334327 A1* | 11/2014 | Wang | .................... | H04W 24/02 370/252 |
| 2015/0109986 A1* | 4/2015 | Siomina | ............... | H04L 1/1854 370/312 |
| 2015/0282202 A1* | 10/2015 | Miao | ....................... | H04L 1/00 370/329 |

OTHER PUBLICATIONS

R2-130499; 3GPP TSG-RAN2 Meeting #81; St. Julian's, Malta, Jan. 28-Feb. 1, 2013; Vodafone Group; "Rational and Scenario for HSPA Uplink Control Channel Overhead Reduction." (1 page).

R2-130155; 3GPP TSG RAN WG2 Meeting #81; St. Julian's, Malta, Jan. 28-Feb. 1, 2013; Huawei, Hisilicon; "UL Control Channel Overhead Reduction for Further EUL Enhancements." (2 pages).

R2-130456; 3GPP TSG-RAN WG2 Meeting #81; St. Julian's, Malta, Jan. 28-Feb. 1, 2013; Ericsson, Stericsson; "CQI Report Reduction" (2 pages).

3GPP TS 25.308 v11.4.0, Mar. 2013, sub clause 8.2.2.

* cited by examiner

| Information Element/Group name | Need | Multi | Type and reference | Semantics description | Version |
|---|---|---|---|---|---|
| CHOICE mode | MP | | | | REL-5 |
| >FDD | | | | | REL-5 |
| >>Measurement Power Offset | MP | | Real (-6 .. 13 by step of 0.5) | The measurement power offset, Γ, in dB, as described in [29]. | REL-5 |
| >>CQI Feedback cycle, k | MP | | Integer (0, 2, 4, 8, 10, 20, 40, 80, 160, | In milliseconds. | REL-5 |
| | | | 16, 32, 64) | In milliseconds. | REL-7 |
| | | | | | |
| >>CQI repetition factor | MP | | Integer (1..4) | | REL-5 |
| >>CQI repetition factor for Multiflow assisting cells | CV-Multiflow | | Integer (1..4) | If present, this IE indicates that all the assisting cells use the CQI repetition factor indicated by this IE. | REL-11 |
| >>Inactivity CQI Feedback | OP | | | | REL-12 |
| >>>Inactivity CQI Feedback cycle, k | MP | | Integer(0, 2, 4, 8, 10, 16, 20, 32, 40, 64, 80, 160, 128, 256, 512, 1024, 2048) | In milliseconds. | REL-12 |
| >>>Inactivity CQI repetition factor | MD | | Integer (1..32) | If this IE is not present when IE "Inactivity CQI Feedback cycle, k" is configured, the default value is the value of the IE "CQI repetition factor". | REL-12 |
| >>>Time to trigger | MP | | Time to trigger 10.3.7.64 | | REL-12 |
| >>Δ<sub>CQI</sub> | MP | | Integer (0..8) | Refer to quantization of the power offset in [28] | REL-5 |
| | | | 9..10) | | REL-11 |
| >TDD | | | | (no data) | REL-5 |

| Condition | Explanation |
|---|---|
| Multiflow | The IE is optional when the Multiflow operation is configured, otherwise it is not needed. |

Figure 2A

| Information Element/Group name | Need | Multi | Type and reference | Semantics description | Version |
|---|---|---|---|---|---|
| CHOICE mode | MP | | | | REL-5 |
| >FDD | | | | | REL-5 |
| >>Measurement Power Offset | MP | | Real (-6 .. 13 by step of 0.5) | The measurement power offset, Γ, in dB, as described in [29]. | REL-5 |
| >>CQI Feedback cycle, k | MP | | Integer (0, 2, 4, 8, 10, 20, 40, 80, 160, | In milliseconds. | REL-5 |
| | | | 16, 32, 64) | In milliseconds. | REL-7 |
| >>CQI repetition factor | MP | | Integer (1..4) | | REL-5 |
| >>CQI repetition factor for Multiflow assisting cells | CV-Multiflow | | Integer (1..4) | If present, this IE indicates that all the assisting cells use the CQI repetition factor indicated by this UE. | REL-11 |
| >>No CQI feedback in inactivity state | OP | | | If the IE is present, the UE stops sending the CQI feedback while no HS-DSCH data is received. The absence of the IE indicates that the UE shall send CQI feedback according to the IE "CQI feedback cycle, k" and the IE "CQI repetition factor". | REL-12 |
| >>>Time to trigger | MP | | Time to trigger 10.3.7.64 | | REL-12 |
| >>$\Delta_{CQI}$ | MP | | Integer (0..8) | Refer to quantization of the power offset in [28] | REL-5 |
| | | | 9..10) | | REL-11 |
| >TDD | | | | (no data) | REL-5 |

| Condition | Explanation |
|---|---|
| Multiflow | The IE is optional when the Multiflow operation is configured, otherwise it is not needed. |

Figure 2B

| Information Element/Group name | Need | Multi | Type and reference | Semantics description | Version |
|---|---|---|---|---|---|
| CHOICE mode | MP | | | | REL-5 |
| >FDD | | | | | REL-5 |
| >>Measurement Power Offset | MP | | Real (-6 .. 13 by step of 0.5) | The measurement power offset, Γ, in dB, as described in [29]. | REL-5 |
| >>CQI Feedback cycle, k | MP | | Integer (0, 2, 4, 8, 10, 20, 40, 80, 160, | In milliseconds. | REL-5 |
| | | | 16, 32, 64) | In milliseconds. | REL-7 |
| >>CQI repetition factor | MP | | Integer (1..4) | | REL-5 |
| >>CQI repetition factor for Multiflow assisting cells | CV-Multiflow | | Integer (1..4) | If present, this IE indicates that all the assisting cells use the CQI repetition factor indicated by this UE. | REL-11 |
| >>CQI variable feedback cycle | OP | | | | REL-12 |
| >>>Initial CQI Feedback cycle, k | MD | | Integer (0, 2, 4, 8, 10, 16, 20, 32, 40, 64, 80, 160, 128, 256, 512, 1024, 2048) | If absent, the default value is the value signalled by the IE "CQI Feedback cycle, k". | |
| >>>Largest CQI Feedback cycle | MP | | Integer (2, 4, 8, 10, 16, 20, 32, 40, 64, 80, 160, 128, 256, 512, 1024, 2048) | UE behaviour is unspecified if the value of this IE is smaller than or equal to the value of the IE "CQI feedback cycle, k". | |
| >>>Hysteresis | OP | | Real(0, 0.5..14.5 by step of 0.5) | | |
| >>>Time to trigger | MP | | Time to trigger 10.3.7.64 | Indicates the period of time during which the event condition has to be satisfied, before the CQI feedback cycle change. Time in ms. | |
| >>Δ_CQI | MP | | Integer (0..8) | Refer to quantization of the power offset in [28] | REL-5 |
| | | | 9..10) | | REL-11 |
| >TDD | | | | (no data) | REL-5 |

| Condition | Explanation |
|---|---|
| Multiflow | The IE is optional when the Multiflow operation is configured, otherwise it is not needed. |

Figure 2C

| Information Element/Group name | Need | Multi | Type and reference | Semantics description | Version |
|---|---|---|---|---|---|
| CHOICE mode | MP | | | | REL-5 |
| >FDD | | | | | REL-5 |
| >>Measurement Power Offset | MP | | Real (-6 .. 13 by step of 0.5) | The measurement power offset, Γ, in dB, as described in [29]. | REL-5 |
| >>CQI Feedback cycle, k | MP | | Integer (0, 2, 4, 8, 10, 20, 40, 80, 160, | In milliseconds. | REL-5 |
| | | | 16, 32, 64) | In milliseconds. | REL-7 |
| >>CQI repetition factor | MP | | Integer (1..4) | | REL-5 |
| >>CQI repetition factor for Multiflow assisting cells | CV-Multiflow | | Integer (1..4) | If present, this IE indicates that all the assisting cells use the CQI repetition factor indicated by this UE. | REL-11 |
| >>CQI reporting event | OP | | | | REL-12 |
| >>> CQI reporting criteria (threshold) | MP | | Integer (0..31) | | Network configured threshold |
| >>> CQI reporting criteria (non-reporting range) | MP | | Integer (1..5) | | Network configured range |
| >>>Hysteresis | OP | | Real(0, 0.5..14.5 by step of 0.5) | | For threshold-based reporting |
| >>>Time to trigger | MP | | Time to trigger 10.3.7.64 | Indicates the period of time during which the event condition has to be satisfied, before sending a CQI. Time in ms. | For threshold-based reporting |
| >>Δcqi | MP | | Integer (0..8) | Refer to quantization of the power offset in [28] | REL-5 |
| | | | 9..10) | | REL-11 |
| >TDD | | | | (no data) | REL-5 |

| Condition | Explanation |
|---|---|
| Multiflow | The IE is optional when the Multiflow operation is configured, otherwise it is not needed. |

Figure 2D

| Information Element/Group name | Need | Multi | Type and reference | Semantics description | Version |
|---|---|---|---|---|---|
| CHOICE *mode* | MP | | | | REL-5 |
| >FDD | | | | | REL-5 |
| >>Measurement Power Offset | MP | | Real (-6 .. 13 by step of 0.5) | The measurement power offset, Γ, in dB, as described in [29]. | REL-5 |
| >>CQI Feedback cycle, k | MP | | Integer (0, 2, 4, 8, 10, 20, 40, 80, 160, | In milliseconds. | REL-5 |
| | | | 16, 32, 64) | In milliseconds. | REL-7 |
| >>CQI Feedback cycle 2, k | OP | | | Feedback cycle could be in the range of 5 sec | REL-12 |
| >>CQI repetition factor | MP | | Integer (1..4) | | REL-5 |
| >>CQI repetition factor for Multiflow assisting cells | CV-*Multiflow* | | Integer (1..4) | If present, this IE indicates that all the assisting cells use the CQI repetition factor indicated by this UE. | REL-11 |
| >>CQI repetition factor 2 | MD | | (5..32) | The default value is the same value as the value of CQI repetition factor. This IE is valid only when CQI Feedback cycle 2, k is present in the received message. | REL-12 |
| >>Δ$_{CQI}$ | MP | | Integer (0..8) | Refer to quantization of the power offset in [28] | REL-5 |
| | | | 9..10) | | REL-11 |
| >TDD | | | | (no data) | REL-5 |

| Condition | Explanation |
|---|---|
| *Multiflow* | The IE is optional when the Multiflow operation is configured, otherwise it is not needed. |

Figure 4A

502: configure a UE with a first configuration for reporting measurement feedback information according to a first reporting cycle using a first set of parameters, and with a second configuration for reporting measurement feedback information according to a second reporting cycle using a second set of parameters

504: control how often the UE reports measurement feedback information by sending to the UE downlink control signaling that directs the UE to switch between the first configuration and the second configuration

506: the downlink control signaling comprises a HS-SCCH order commanding the UE to:
- switch to the first cycle;
- switch to the second cycle; or
- turn off the reporting of measurement feedback information

Figure 5

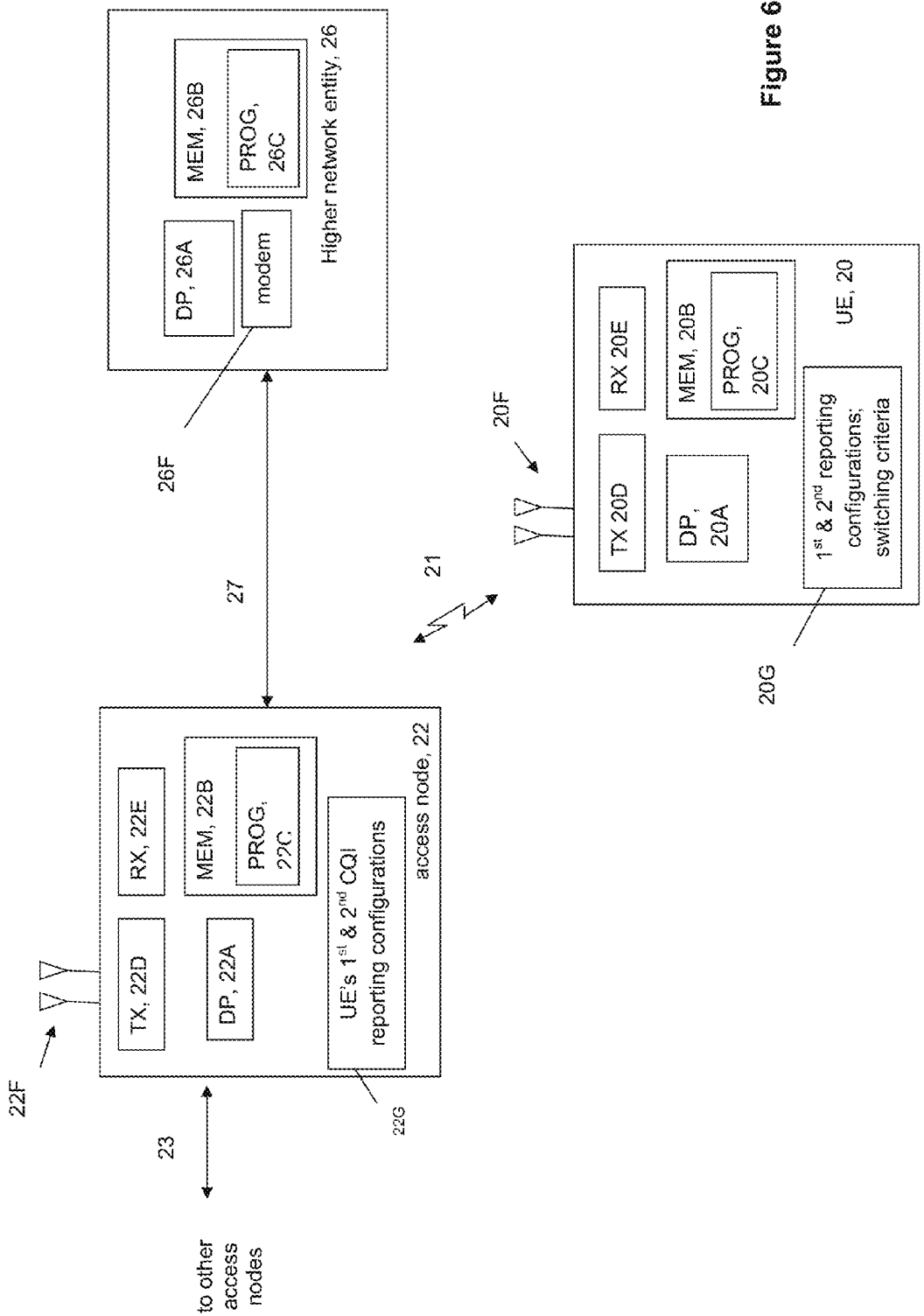

US 9,439,088 B2

METHODS, APPARATUS AND COMPUTER PROGRAMS FOR OPERATING A RADIO ACCESS NETWORK AND USER EQUIPMENT

TECHNICAL FIELD

The present invention relates to methods, apparatus and computer programs for operating a radio access network and user equipment. The exemplary and non-limiting embodiments of this invention relate generally to wireless communication systems, methods, devices and computer programs. Specific examples relate to adjusting the frequency of channel quality reports that are sent wirelessly.

BACKGROUND

The Third Generation Partnership Project (3GPP) has set forth a study item for further enhancements to the uplink; see document RP-122019 (3GPP TSG Meeting #58; Barcelona, Spain; 4-7 Dec. 2012). One objective of this study item is to reduce the uplink control channel overhead for high speed packet access (HSPA) operation; properly reducing control channel overhead can allow more spectrum to be made available for data. For example, document R2-130499 by Vodaphone Group and entitled "Rationale and scenario for HSPA uplink control channel overhead reduction" (3GPP TSG-RAN2 Meeting #81; St. Julian's, Malta; 28 Jan. to 1 Feb. 2013) asserts that the capacity taken up by uplink control channel overhead heavily reduces the uplink data capacity available in the cell.

One type of control signalling in HSPA is the channel quality indicator (CQI), which indicates how much transport block size can be transmitted over the high speed downlink packet access (HSDPA) protocol. Frequent CQI reporting is important to maintain good downlink efficiency because it tells the base station scheduler the data rate that the mobile terminal expects to be able to receive at a given point in time. The CQI value that the mobile terminal (or "user equipment" UE) reports is a combination of the signal to interference ratio (SIR) the UE is experiencing and a function of the multipath environment, the UE receiver type, the ratio of the interference of the UE's own base transceiver station (BTS, also termed a NodeB) as compared with other BTSs, and the expected BTS HSDPA power availability.

Specifically for the HSPA protocol, sub clause 8.2.2 of 3GPP TS 25.308 v11.4.0 describes CQI as being used to select transport format and resource by the high-speed downlink shared channel (HS-DSCH) serving NodeB. For frequency division duplex (FDD) operation, the transmission rate of the measurement report to the network is configured by higher layer signalling. For time division duplex (TDD) operation, a CQI report is associated with each high-speed shared control channel (HS-SCCH) transmission when a UE is operating in the CELL_DCH state.

FIG. 1 shows a signalling diagram showing the relation of CQI reporting on the uplink control channel HS-DPCCH (HS-dedicated physical control channel) and data capacity on the downlink channel HS-PDSCH (HS-physical downlink shared channel). The UE derives CQI based on the measured common pilot channel (CPICH) quality and reports it on the HS-DPCCH to the serving cell that controls the HS-DSCH. The serving cell schedules data to be sent on the HS-PDSCH, using the reported CQI to determine data rate and other transport parameters, and then sends the data as scheduled. Having reported the CQI, the UE can anticipate what transport parameters will be used for that data transmission. Inadequate CQI leads to a downgrade in how efficiently the data can be sent, but excess CQI reporting occupies spectrum that is not available for data.

Reduction of the CQI report has been identified as one way to reduce the uplink control channel overhead for HSPA operation; see for example document R2-130155 by Huawei and HiSilicon entitled "UL control channel overhead reduction for Further EUL Enhancements", and also R2-130456 by Ericsson and ST Ericsson entitled "CQI report reduction" (both from 3GPP TSG-RAN2 Meeting #81; St. Julian's, Malta; 28 Jan. to 1 Feb. 2013). The former document suggests reducing the CQI reporting by setting the CQI transmission priority to zero when the HS-DSCH transmission is inactive. The latter document suggests examining when it would be appropriate to reduce or discontinue (DTX) the CQI transmission in the uplink and when it is appropriate to have "normal" CQI transmissions. These teachings provide a different approach to reduce CQI transmissions as compared to conventional HSPA practice.

BRIEF DESCRIPTION OF THE DRAWINGS

FIG. 2A shows an exemplary Measurement Feedback Information Information Element (IE) modified according to these teachings to support the first embodiment;

FIG. 2B is similar to FIG. 2A but modified according to these teachings to support the first embodiment for the specific case in which the second configuration is restricted only to no CQI feedback reporting;

FIG. 2C is similar to FIG. 2A but modified according to these teachings to support the second embodiment;

FIG. 2D is similar to FIG. 2A but modified according to these teachings to support event-driven CQI reports in addition to periodic CQI reports according to a cycle;

FIG. 4A is similar to FIG. 2A but modified according to these teachings to support the third embodiment;

FIG. 5 shows a logic flow diagram that illustrates the operation of an example of a method, a result of execution of by apparatus, and execution of computer instructions comprising code embodied on a computer readable memory, in accordance with the embodiments of this invention that are described herein with respect to FIGS. 4A-B; and FIG. 6 shows a simplified block diagram of an example of a UE in communication with an access node and a higher network entity illustrating exemplary electronic devices suitable for use in practicing the exemplary embodiments of this invention.

DETAILED DESCRIPTION

Figure 1:
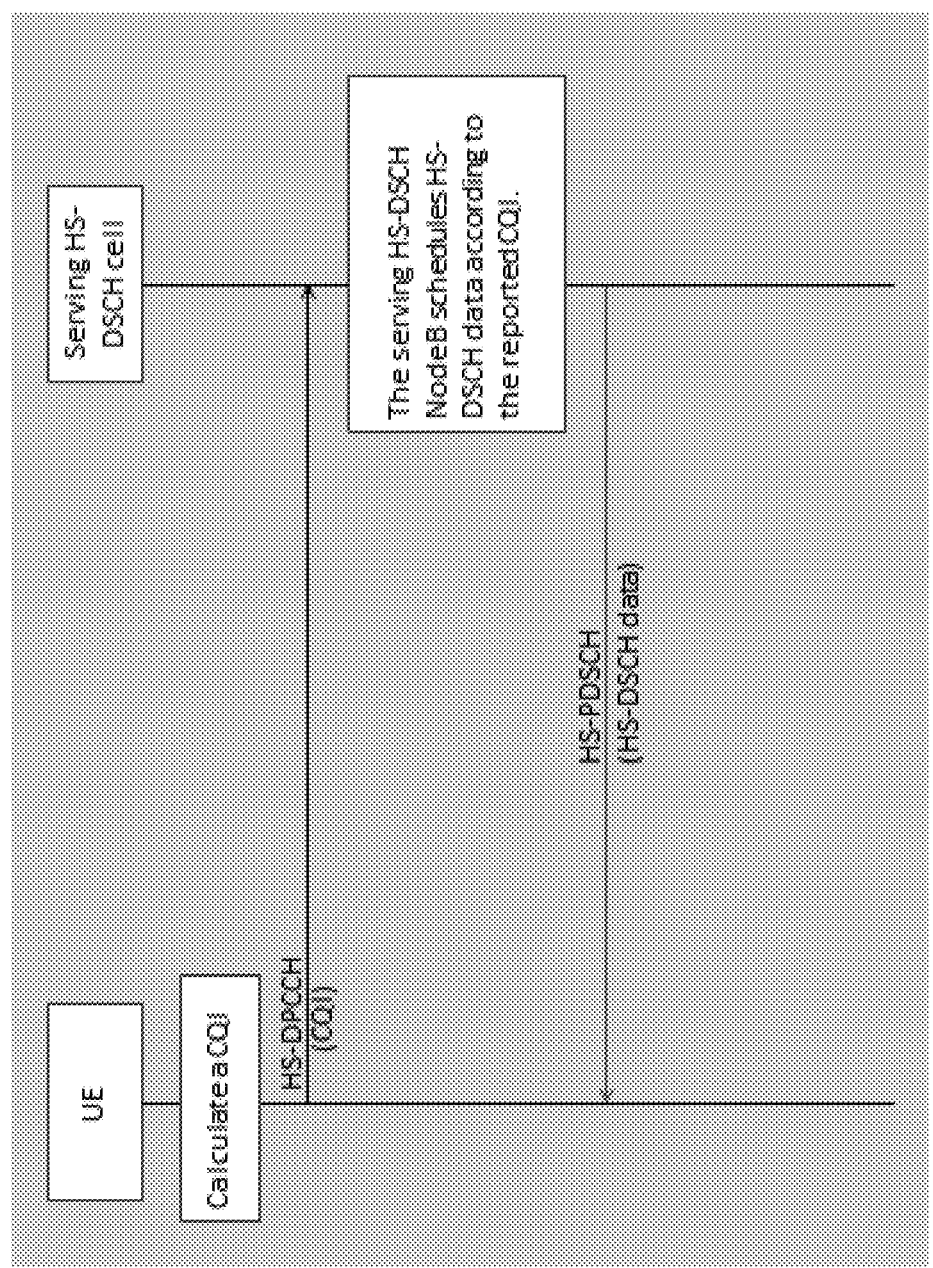
FIG. 1 shows a prior art signalling diagram illustrating CQI reporting on the uplink control channel HS-DPCCH and scheduled data sent on the downlink channel HS-PDSCH using transport parameters determined from the reported CQI.

According to a first aspect of the present invention, there is provided a method for operating a user equipment (UE), the method comprising: receiving at the user equipment from a radio network access node a first configuration for reporting measurement feedback information according to a first reporting cycle using a first set of parameters, and a second configuration for reporting measurement feedback information according to a second reporting cycle using a second set of parameters; and based on comparing a data or a channel measurement against a predefined threshold, switching between the first cycle and the second cycle for reporting measurement feedback information.

According to a second aspect of the present invention, there is provided apparatus for operating a user equipment (UE), the comprising a processing system configured to cause the apparatus at least to: receive from a radio network access node a first configuration for reporting measurement feedback information according to a first reporting cycle using a first set of parameters, and a second configuration for reporting measurement feedback information according to a second reporting cycle using a second set of parameters; and based on comparing a data or a channel measurement against a predefined threshold, switch between the first cycle and the second cycle for reporting measurement feedback information.

According to a third aspect of the present invention, there is provided a computer program comprising a set of computer instructions for operating a user equipment, the set of computer instructions comprising: code for receiving at the user equipment from a radio network access node a first configuration for reporting measurement feedback information according to a first reporting cycle using a first set of parameters, and a second configuration for reporting measurement feedback information according to a second reporting cycle using a second set of parameters; and code for switching, based on comparing a data or a channel measurement against a predefined threshold, between the first cycle and the second cycle for reporting measurement feedback information.

According to a fourth aspect of the present invention, there is provided a method for operating a network access node, the method comprising: configuring a user equipment with a first configuration for reporting measurement feedback information according to a first reporting cycle using a first set of parameters, and with a second configuration for reporting measurement feedback information according to a second reporting cycle using a second set of parameters; and controlling how often the user equipment reports measurement feedback information by sending to the user equipment downlink control signalling that directs the user equipment to switch between the first configuration and the second configuration.

According to a fifth aspect of the present invention, there is provided apparatus for operating a network access node, the apparatus comprising a processing system configured to cause the apparatus at least to: configure a user equipment with a first configuration for reporting measurement feedback information according to a first reporting cycle using a first set of parameters, and with a second configuration for reporting measurement feedback information according to a second reporting cycle using a second set of parameters; and control how often the user equipment reports measurement feedback information by sending to the user equipment downlink control signalling that directs the user equipment to switch between the first configuration and the second configuration.

According to a sixth aspect of the present invention, there is provided a computer program comprising a set of computer instructions for operating a network access node, the set of computer instructions comprising: code for configuring a user equipment with a first configuration for reporting measurement feedback information according to a first reporting cycle using a first set of parameters, and with a second configuration for reporting measurement feedback information according to a second reporting cycle using a second set of parameters; and code for controlling how often the user equipment reports measurement feedback information by sending to the user equipment downlink control signalling that directs the user equipment to switch between the first configuration and the second configuration.

The processing systems described above may comprise at least one processor, and at least one memory including computer program code.

There may be provided a computer-readable memory tangibly storing a set of computer instructions as described above.

The examples detailed herein are in the context of a UE operating in a radio network utilizing the HSPA radio access technology including Wideband Code Division Multiple Access (WCDMA) and Evolved HSPA (sometimes termed HSPA+), but this is only one example in order to provide a practical context for describing the inventive concepts detailed herein. These teachings may be utilized with other types of radio access technologies, such as for example Universal Terrestrial Access Radio Access (UTRA), Evolved UTRA (E-UTRA, sometime referred to as Long Term Evolution or LTE and including LTE-Advanced), Global System for Mobile Communications (GSM) and the like. The specific names of messages, channels, operating states and various network entities in the examples below follow the nomenclature for HSPA, and these names also are not limiting to the broader teachings presented below but are for clarity of explanation.

Document RP-122019 mentioned in the background section above has a generic requirement to reduce uplink control channel overhead by reducing CQI reporting. But the present inventors have found other scenarios where reducing the CQI reporting helps in increased coverage. Excess CQI reports transmitted on the HS-DPCCH become an overhead since they occupy uplink radio resources, and at least in WCDMA they potentially interfere with other UEs. Avoiding or reducing the uplink HS-DPCCH transmission, for example where a UE has stopped receiving downlink traffic, would result in increased uplink resource available for the other users. It would therefore be desirable to avoid unnecessary CQIs under these scenarios.

For the above scenarios and others, there are several embodiments of these teachings for effecting a reduction in CQI reporting as compared to conventional HSPA practice. Specifically, the first and second embodiment, described with respect to FIGS. 2A through 2C, enable the UE to change its CQI reporting based on the UE's own observations of the channel. In both these embodiments the network configures the UE with two different sets of parameters for reporting CQI (or more generally, for reporting measurement feedback information) according to two different reporting cycles, but the switch from one reporting cycle to the other is done at the UE based on the UE's own measurements. In the third embodiment described with respect to FIGS. 4A and 4B, the network also configures the UE with two different sets of parameters for reporting measurement feedback information according to two different reporting cycles, but in this case the network commands the switch from one cycle to the other via direct signalling.

FIG. 2B is a specific variation on the more generalized embodiment of FIG. 2A. Similar to the embodiments of FIGS. 2A-C, it is the UE that changes its CQI reporting cycle in the FIG. 2D embodiment except in the FIG. 2D example there is an event-driven CQI reporting option for the UE to switch its configurations based on its channel quality indication derived from the measured channel quality. This also can reduce the UE's CQI reporting on the uplink control channel. For the case of the event-driven CQI reporting of FIG. 2D, switching to the event-driven CQI reporting does not necessarily discontinue the conventional periodic CQI reporting as both may be done by the same UE, but, as will be detailed below, when there is no traffic for the UE, it will discontinue its periodic CQI reporting and conduct the event-driven CQI reporting based on a comparison of its CQI derived from the measured channel quality against a threshold or range.

FIG. 2A shows an exemplary Measurement Feedback Information Information Element (IE), taken from 3GPP TS25.331 version 11.5.0 section 10.3.6.40a and modified according to these teachings to support the first embodiment. This IE 200A includes a first set of parameters 201A (CQI feedback cycle, k and CQI repetition factor) which make up the UE's first configuration for reporting measurement feedback information according to a first reporting cycle. In this particular example this IE 200A is modified to also include a second set of parameters 202A (inactivity CQI feedback cycle, k and inactivity CQI repetition factor) which make up the UE's second configuration for reporting measurement feedback information according to a second reporting cycle; and further this IE 200A has a reporting cycle switching criterion 203A (time to trigger) for controlling when the UE is allowed to switch from the first to the second reporting cycle. The IE 200A may also include a flag 204A (inactivity CQI feedback) which indicates to the UE decoding this IE 200A that there is a second set of parameters 202A therein.

The network configures the new (second set of) parameters 201A, namely the "inactivity CQI feedback cycle" and the "inactivity CQI repetition factor", which in this embodiment are used only when the UE does not receive any HS-DSCH data for a certain time period, which is identified by the reporting cycle switching criteria/time to trigger 203A.

The new/second CQI feedback cycle can signal a much longer cycle than the first cycle, which for this example may be assumed to be a conventional CQI feedback cycle. The new/second cycle can also enable no CQI reporting as well so that the UE can stop CQI reporting completely when the UE does not receive any HS-DSCH data for a certain time period. Whether the CQI reporting according to the second set of parameters is for reporting at a much longer interval than conventional intervals, or whether CQI reporting is discontinued completely while the no HS-DSCH data condition persists, depends on the specific values of the second set of parameters 202A that the network sets for the second configuration assigned to this UE. Additionally or instead, the new CQI repetition factor (the inactivity CQI repetition factor) can signal a higher number of repetitions than the repetition factor of the first set of parameters. To ensure a uniform understanding among the networks and the UEs implementing this first embodiment, a relevant wireless radio protocol can be adapted to make clear that:

If HS-DSCH data is not received for a time period indicated by "Time to trigger", k is set to "inactivity CQI feedback cycle, k" and N_cqi_transmit is set to "inactivity CQI repetition factor". Otherwise, k is set to "CQI feedback cycle, k" and N_cqi_transmit is set to "CQI repetition factor".

For example, this or similar text can be added to subclauses 6A.1.2.1 and/or 6A.1.2.2 of 3GPP TS 25.214 V11.5.0; where k is identifying time interval of the CQI feedback cycle and N is a positive integer identifying over how many next consecutive HS-DPCCH sub-frames UE transmits the CQI reports.

FIG. 2B shows an exemplary Measurement Feedback Information Information Element (IE) 200B similar to that of FIG. 2A but modified in a different way than FIG. 2A for the specific case in which the second configuration for reporting measurement feedback information is to not report CQI at all. In this embodiment the IE 200B includes a first set of parameters 201B (CQI feedback cycle, k and CQI repetition factor) which make up the UE's first configuration for reporting measurement feedback information according to a first reporting cycle. In this particular example, this IE 200B does not explicitly list a second set of parameters but rather a field 202B that indicates simply that there is to be no CQI feedback under the second configuration for reporting measurement feedback information according to a second reporting cycle. From this field the second set of parameters are implied: no CQI reporting and a repetition factor of zero. Like the example of FIG. 2A, this IE 200B may also have a reporting cycle switching criterion 203B (time to trigger) for controlling when the UE is allowed to switch from the first to the second reporting cycle, namely when the UE does not receive any HS-DSCH data for the predetermined period of time in field 203B. Like FIG. 2A, in the FIG. 2B embodiment the UE resumes the CQI feedback when the UE receives HS-DSCH data. The example of FIG. 2B saves some signalling overhead by not providing a non-zero cycle and repetition period for the second configuration, which in FIG. 2B is understood to mean no CQI reporting at all.

To ensure uniform recognition and interpretation of the IE 200B at FIG. 2B, a wireless protocol such as 3GPP TS 25.214 may be modified at subclause 6A.1.2.1 and 6A.1.2.2 respectively to state:

If "No CQI feedback in inactivity state" is configured by higher layer and any HS-DSCH data is not received for a time period indicated by "Time to trigger", the UE shall stop transmitting the CQI report until the UE receives any HS-DSCH data.

FIG. 2C shows an exemplary Measurement Feedback Information Information Element (IE) 200C similar to that of FIG. 2A but modified according to these teachings to support the second embodiment. This IE 200C also includes a first set of parameters 201C (CQI feedback cycle, k and CQI repetition factor) which make up the UE's first configuration for reporting measurement feedback information according to a first reporting cycle. In this particular example this IE 200C is also modified to additionally include a second set of parameters 202C (initial CQI feedback cycle, k and largest CQI feedback cycle), which are used to define the UE's second configuration for reporting measurement feedback information according to a second reporting cycle. In this case, the second cycle is not fixed but variable, depending on what the UE observes in the channel. This IE 200C also has reporting cycle switching criteria 203C (hysteresis, time to trigger and $\Delta_{CQI}$) for controlling when the UE is allowed to switch from the first to the second/variable reporting cycle. The IE 200C may also include a flag 204C (CQI variable feedback cycle) which indicates to the UE decoding this IE 200C that there is a second set of parameters 202C therein.

The network configures the variable interval CQI reporting via a downlink radio resource control (RRC) message that carries this IE 200C. When the variable interval CQI reporting is configured for this UE, the UE checks how often certain criteria are met for a certain time period. In the FIG.

2C example, the UE checks how often the CQI value derived from the measured channel quality changes more than a certain difference from the previously reported CQI value within a certain time period (which is given as the time to trigger). The hysteresis field is optional and simply to prevent CQI differences that are borderline near the threshold value from being over-counted via a ping-pong effect.

If the threshold CQI value criterion is met for a certain predetermined period of time or is met more often than a certain predefined threshold number of times over a given time interval, then the CQI feedback cycle is reduced in a certain way. Similarly, if the threshold CQI value criterion is not met for the certain predetermined period of time (or is met fewer than the certain predefined threshold number of times over the given time interval), then the CQI feedback cycle is increased in a certain way. For example, if the threshold CQI value criterion is met between 1 and 3 times over the interval the rule may be for the UE to adopt the next longer CQI reporting cycle than the cycle it is currently using; or if met 4 or more times then the UE is to adopt the next longer CQI reporting cycle after that one. Similarly, if the threshold CQI value criterion is not met over the interval, the rule may be for the UE to adopt the next shorter CQI reporting cycle as compared to the cycle it is currently using (or not adopt a new CQI reporting cycle at all, depending on the rule).

To ensure a uniform understanding among the networks and the UEs implementing this second embodiment, a relevant wireless radio protocol can be adapted to make clear that:
When the variable CQI feedback cycle is configured in the UE, the UE shall:
1> if Equation 1 below has been fulfilled for a time period indicated by "Time to trigger":
2> update the CQI feedback cycle, k according to the following formula; CQI feedback cycle, k=max (the previously used CQI feedback cycle, k/2, the value of the IE "CQI feedback cycle, k")
1> if Equation 2 below has been fulfilled for a time period indicated by "Time to trigger":
2> update the CQI feedback cycle, k according to the following formula; CQI feedback cycle, k=min (the previously used CQI feedback cycle, k×2, the value of the IE "Largest CQI feedback cycle")

$$\begin{cases} CQI_{New} < CQI_{PreviouslyReported} - H_{CQI} \text{ or} \\ CQI_{New} > CQI_{PreviouslyReported} + H_{CQI} \end{cases} \quad \text{Equation 1}$$

$$\begin{cases} CQI_{New} \geq CQI_{PreviouslyReported} - H_{CQI} \text{ and} \\ CQI_{New} \leq CQI_{PreviouslyReported} + H_{CQI} \end{cases} \quad \text{Equation 2}$$

The variables in the above formulas are defined as follows: $CQI_{New}$ is the latest CQI value for the serving HS-DSCH cell; $CQI_{PreviouslyReported}$ is the CQI value which was previously reported by this UE to the network; and $H_{CQI}$ is the hysteresis factor. The above or similar text can be added to subclauses 6A.1.2.1 and/or 6A.1.2.2 of 3GPP TS 25.214 V11.5.0 to ensure uniform adoption and understanding by all the various cells and UEs.

FIG. 2D shows an exemplary Measurement Feedback Information Information Element (IE) 200D similar to that of FIG. 2A but modified according to these teachings to support a further embodiment in which event-triggered CQI reporting is added on top of the UE's conventional periodic measurement feedback reporting. This IE 200D includes a first set of parameters 201D (CQI feedback cycle, k and CQI repetition factor) which make up the UE's first/periodic configuration for reporting measurement feedback information according to a first reporting cycle. In this particular example, this IE 200D is also modified to additionally include parameters for the UE to perform event triggered CQI reporting according to the defined CQI reporting criteria (CQI reporting criteria/threshold 205D and/or CQI reporting criteria/non-reporting range 206D). The event reporting criteria may be considered to be a set of parameters for the second configuration for reporting event-driven measurement feedback information, for which the second reporting cycle itself is event-driven. There may be a CQI reporting event flag 204D in the IE 200D to indicate that this IE 200D also configures event-driven CQI reporting. These event triggered CQI reporting criteria may be configured by the network for the UE via RRC signalling. The IE 200D may also include further event-driven reporting conditions 203D (hysteresis, time to trigger) for controlling when the UE is allowed to report CQI if the event criteria are met. So for example if some reporting threshold 205D is met momentarily, the time to trigger 203D may be longer than that momentary event and so the UE would not consider the event as being reportable even though the event was in fact triggered momentarily. The hysteresis field aids in preventing multiple event-driven CQI reports being sent closely spaced in time that may provide only repetitive information for the network.

In the FIG. 2D embodiment, when the UE is configured for CQI reporting, the UE suspends its periodic CQI reporting when the UE does not receive any HS-DSCH data for a predetermined period of time, and once it again receives HS-DSCH data the UE resumes its periodic CQI reports to the network according to the configured CQI feedback cycle and repetition factor 201D.

In addition to this periodic CQI reporting, the UE which is also configured with event-based CQI reporting as in FIG. 2D will also report CQI when the event-based parameters 205D and/or 206D are satisfied to the extent of the reporting conditions 203D. FIG. 2D shows two different event-based reporting criteria 205D, 206D, and any given IE 200D can have one or more such reporting event criteria.

A threshold based CQI reporting event is configured at 205D. In this case the UE reports a new CQI to the network if the CQI value becomes smaller than the threshold given at 205D (and remains so for the time to trigger interval given at 203D). The threshold may in different embodiments be a network-configurable parameter, or it may be set to take on the previously reported CQI value.

A range-based CQI reporting event is configured at 206D. In this case the network gives the UE a non-reporting range. If the CQI value derived from the measured channel quality is outside of the non-reporting range 206D for a minimum duration of the time to trigger 203D, then the event is satisfied and the UE reports the new CQI value to the network. The non-reporting range may be determined using the previously reported CQI value. For example, the non-reporting range upper threshold may=$CQI_{previously\ reported}$+ the reporting range (which is configured by the network at 206D), and the non-reporting range lower threshold may=$CQI_{previously\ reported}$.

To ensure a uniform understanding among the networks and the UEs implementing this FIG. 2D embodiment, a relevant wireless radio protocol such as subclauses 6A.1.2.1 and 6A.1.2.2 of 3GPP TS 25.214 can be adapted to specify:
When CQI reporting event is configured in the UE, the UE shall:

1>if the equation below has been fulfilled for a time period indicated by "Time to trigger":
2>the UE shall transmit the CQI report containing the CQI value for the serving HS-DSCH cell.

Equation 1 (Triggering Condition for Threshold Based Solution)

$$CQI_{New} < CQI_{Threshold} - H_{CQI}$$

(Triggering condition for non-reporting range based solution)

$$\begin{cases} CQI_{New} \geq CQI_{UpperThreshold} + H_{CQI} \text{ or} \\ CQI_{New} \leq CQI_{LowerThreshold} - H_{CQI} \end{cases} \quad \text{Equation 2}$$

The variables in the formula are defined as follows:

$CQI_{New}$ is the latest CQI value for the serving HS-DSCH cell.

$CQI_{Threshold}$ is either the threshold configured for the CQI reporting (205D of FIG. 2D) or given by "the previously reported CQI value" (for the case of a variable threshold).

$CQI_{UpperThreshold}$ is given by "the previously reported CQI value+the value of the IE "non-reporting range".

$CQI_{LowerThreshold}$ is given by "the previously reported CQI value".

$H_{CQI}$ is the hysteresis parameter for the CQI reporting event.

The above embodiments provide the technical effect of reducing the frequency of CQI reporting which allows the uplink control plane overhead to be reduced without significantly compromising the data throughput.

Figure 3:
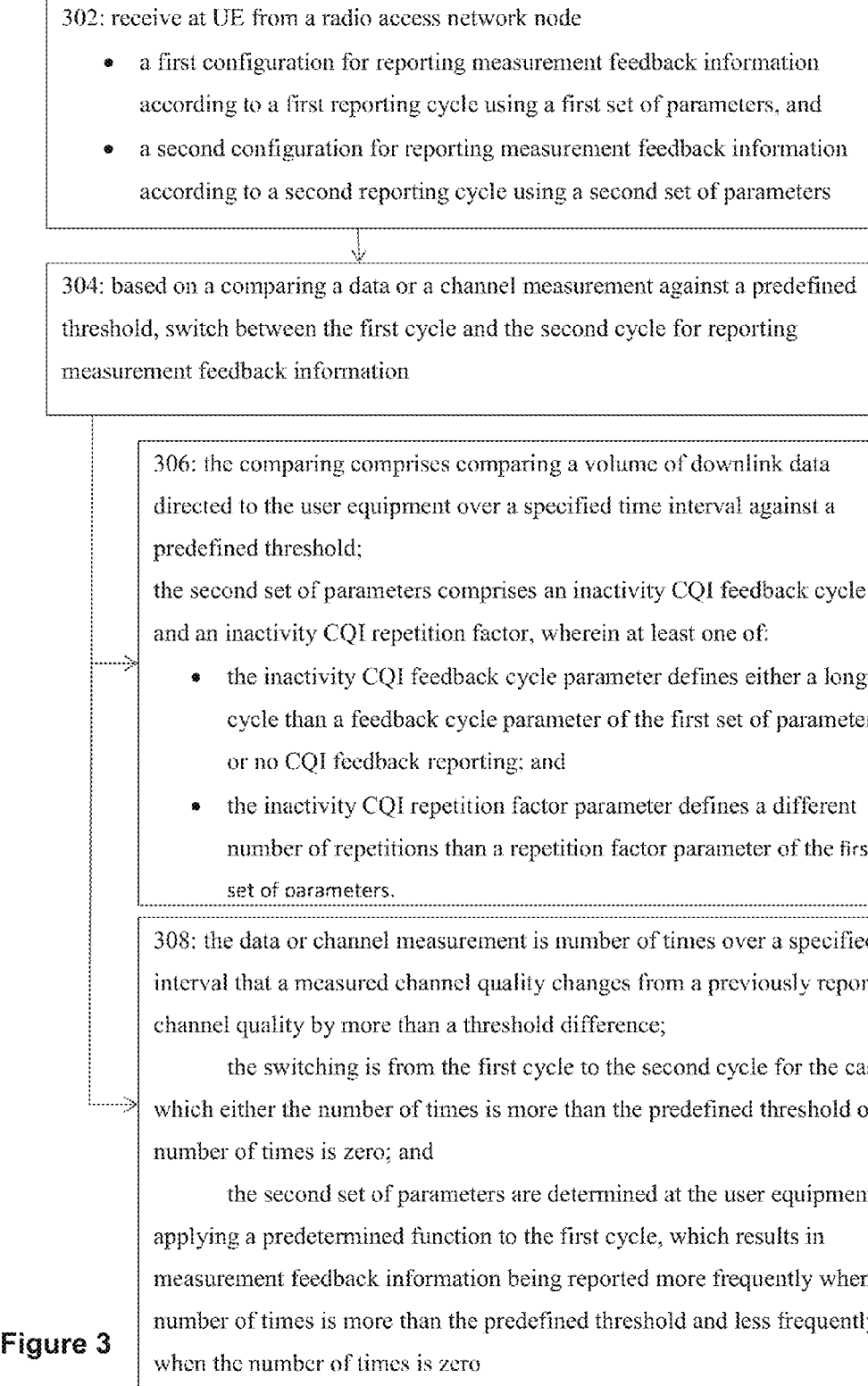
FIG. 3 shows a logic flow diagram that illustrates the operation of an example of a method, a result of execution of by apparatus, and execution of computer instructions comprising code embodied on a computer readable memory, in accordance with the embodiments of this invention that are described herein with respect to FIGS. 2A-D.

FIG. 3 presents a summary of the above teachings according to the above embodiments for operating a user equipment (UE) such as for example a UE operating in a HSPA (including a WCDMA) network, and in other deployments in a LTE and/or LTE-Advanced (LTE-A) network. As noted above, these are non-limiting deployments. At block 302 the UE receives from a radio access network node (for example, a radio network controller (RNC), a NodeB, an eNB or other type of BTS) a first configuration for reporting measurement feedback information according to a first reporting cycle using a first set of parameters, and a second configuration for reporting measurement feedback information according to a second reporting cycle using a second set of parameters. Then at block 304, based on comparing a data or a channel measurement against a predefined threshold, the UE switches between the first cycle and the second cycle for reporting measurement feedback information. In practice, this becomes manifest from the different CQI reports the UE sends.

Block 304 uses fairly generic language of comparing a data or channel measurement. In the more particularized examples above, the data or channel measurement is a) volume of downlink data directed to the user equipment over a specified time interval, or b) number of times over a specified time interval that a measured channel quality changes from a previously reported channel quality by more than a threshold difference, or c) a channel quality indicator derived based on the measured channel quality. In addition, in those examples the switching is from the first cycle to the second cycle for the case in which the volume of downlink data or the number of times is less than the predefined threshold; and if the switching is also to go back then it follows that the switching is from the second cycle to the first cycle for the case in which the volume of downlink data or the number of times is more than the predefined threshold.

In addition, given that the above examples were specific to HSPA, those examples further had the measurement feedback information comprising at least a channel quality indicator (CQI); the uplink control channel being a high-speed dedicated physical control channel (HS-DPCCH); and the downlink data that is directed to the user equipment being on a high-speed downlink shared channel (HS-DSCH).

The first embodiment above which was described with respect to FIG. 2A included an inactivity CQI feedback cycle and repetition factor. This is summarized at block 306, wherein the comparing from block 304 comprises comparing a volume of downlink data directed to the UE over a specified time interval against a predefined threshold. In this embodiment, the second set of parameters comprises an inactivity CQI feedback cycle and an inactivity CQI repetition factor, wherein a) the inactivity CQI feedback cycle parameter defines either a longer cycle (less frequent reports) than a feedback cycle parameter of the first set of parameters or no CQI feedback reporting; and/or b) the inactivity CQI repetition factor parameter defines a different number of repetitions than a repetition factor parameter of the first set of parameters. Though FIG. 2B has no explicit recitation of a second repetition factor, for the case of no CQI feedback reporting as FIG. 2B describes the repetition factor is necessarily zero.

The second embodiment above which was described with respect to FIG. 2C included a variable CQI feedback cycle. This is summarized at block 308 wherein the data or channel measurement is number of times over a specified time interval that a measured channel quality changes from a previously reported channel quality by more than a threshold difference. In another implementation, the data or channel measurement is a channel quality indicator (CQI) derived from measured channel quality. In this embodiment, the switching is from the first cycle to the second cycle for the case in which either the number of times (or the value of the derived CQI) is more than the predefined threshold or the number of times (or the value of the derived CQI) is less than the predefined threshold; and the second set of parameters are determined at the user equipment by applying a predetermined function to the first cycle. In this embodiment, the predetermined function results in measurement feedback information being reported more frequently for the case that the number of times (or the value of the derived CQI) is more than the predefined threshold (for example, the frequency of the CQI reports is doubled), and it results in measurement feedback information being reported less frequently for the case that the number of times (or the value of the derived CQI) is less than the predefined threshold (for example, the frequency of the CQI reports is halved). A similar function and similar results can be obtained using the CQI range embodiment instead of the above threshold, where the range can be a function of the previously reported CQI value (for example, the previously reported CQI value is the center of the given range).

Further for the second embodiment, the example above described a specific implementation in which the first cycle is a previously used CQI feedback cycle, the second cycle is a new CQI feedback cycle having time interval k, and the predetermined function for switching from the previously used CQI feedback cycle to the new CQI feedback cycle is:

New CQI feedback cycle, k=max (the previously used CQI feedback cycle, k/2, a configured minimum value of CQI feedback cycle).

FIG. 4A shows an exemplary Measurement Feedback Information Information Element (IE) similar to that of FIG.

2A but modified according to these teachings to support the third embodiment. This IE 400 also includes a first set of parameters 401 (CQI feedback cycle, k and CQI repetition factor) which make up the UE's first configuration for reporting measurement feedback information according to a first reporting cycle. In this particular example this IE 400 is modified to further include a second set of parameters 402 (CQI feedback cycle-2, k and CQI repetition factor-2) which are used to define the UE's second configuration for reporting measurement feedback information according to a second reporting cycle. In this case though the UE does not switch between the first and second configurations for reporting CQI based on its own measurement of the channel and activity or lack thereof on it; instead in the third embodiment the network controls more directly the switching in that the UE switches when it receives a new command to do so.

The network configures the two sets of parameters 401, 402 for reporting measurement feedback information via RRC signalling that carries the illustrated IE 400 for example. As with the first embodiment, one implementation for this second embodiment is that the first reporting cycle is a legacy CQI cycle and the second reporting cycle is newly defined to represent less frequent CQI reporting than any of the legacy CQI reporting cycles.

Figure 4B:
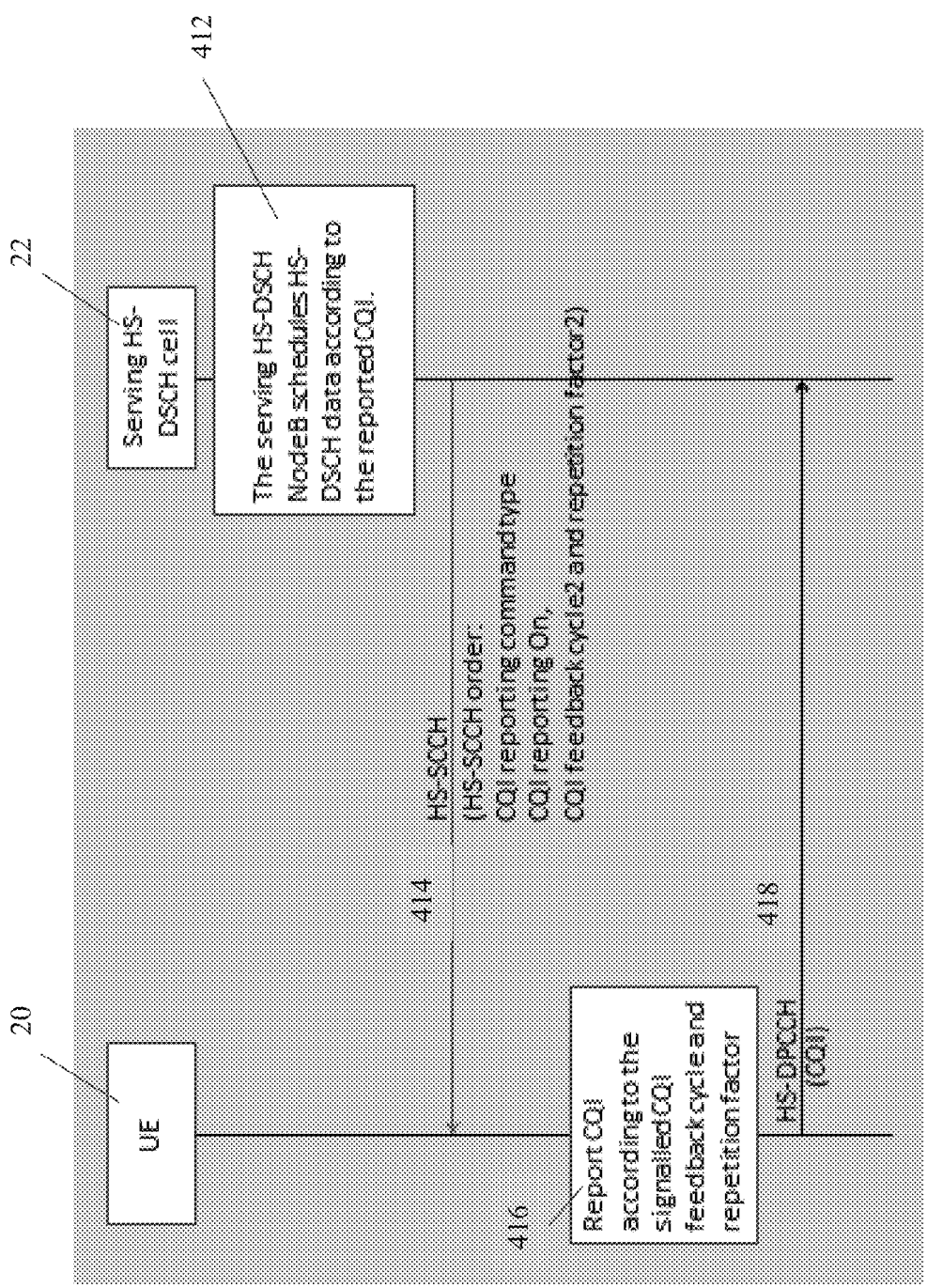
FIG. 4B is similar to FIG. 1 but modified according to the third embodiment.

FIG. 4B shows a signalling diagram similar to FIG. 1 but modified to illustrate one implementation of how the network commands the UE to change between the first and the second configuration for reporting measurement feedback information. This particular non-limiting implementation of the third embodiment utilizes the HS-SCCH order, for which further background may be seen at 3GPP TS 25.212 V11.4.0 at section 4.6C "Coding for HS-SCCH orders".

In short the network (represented in FIG. 4B as the serving HS-DSCH cell 22) orders the UE 20 to stop or start the CQI reporting or change the CQI reporting based on the new/second feedback cycle and repetition factor, or based on the legacy/first feedback cycle and repetition factor. The serving cell 22 schedules at 412 HS-DSCH data according to some previously reported CQI (not shown), and in this example the network 22 makes the decision to change the UE's CQI reporting cycle.

As summarized at the HS-SCCH order message 414, the HS-SCCH order format has three bits defined for Order Type and 3 bits defined for Order Information. In this third embodiment there is defined herein a new bit value for the HS-SCCH Order Type: 010. In this example, the three bits of the HS-SCCH Order Information field are interpreted as follows:

First bit: 0=>CQI Off=>UE shall stop sending CQI reports.
  i. 1=>CQI On=>UE shall start sending CQI reports.
Second bit: 0=>Legacy/first CQI feedback cycle and CQI repetition factor.
  2=>Newly defined/second feedback cycle and CQI repetition factor.
Third bit: 0=>Unused
  i. 1=>Unused When the UE 20 receives the SCCH order from the network 22 then the UE 20 will interpret it as follows (where x is any value):
  0 0 x or 0 1 x—Stop CQI reporting.
  1 0 x—Start CQI report with legacy/first cycle and legacy/first repetition factor.
  1 1 x—Start CQI report with newly defined/second cycle and newly defined/second repetition factor.

In other embodiments the meaning of the first two bits can be reversed as compared with the above example, or the third (unused) bit can be used for the meaning given above for the first or second bits (or the reverse of the above meanings). When the network 22 has a large amount of data to send then it may select one of the legacy feedback cycles and repetition factors and signal 1 0 x so the UE 20 reports CQI according to one of the legacy cycles and repetition factors. When there is a long period of data inactivity then the network 22 may switch to a newly defined longer feedback cycle (CQI Feedback cycle 2) and repetition period (CQI repetition factor 2) by signalling 1 1 x to the UE 20 in the HS-SCCH order message 414. The UE at 416 changes its CQI feedback reporting to match the CQI feedback cycle and repetition factor that was signaled in message 414, and at message 418 the UE 20 reports the CQI on the HS-PDCCH according to the signaled (second) cycle and repetition factor.

The third embodiment above provides the technical effect of ensuring a reduction in CQI reporting and therefore improvement in uplink capacity and end user performance due to reduced interference. Another technical effect of this third embodiment as provided in the FIG. 4A-B example is that it does not require any capability signalling because the newly added IE 400 is mandatory for Release-12. There are some RRC signalling changes and so there would need to be some minor adaptations to engage legacy UEs and network access nodes in adopting this embodiment.

FIG. 5 presents a summary of the above teachings according to the first embodiment for operating a radio access network node such as a RNC or a NodeB operating in a HSPA/UTRAN (including a WCDMA) network, or some other type of higher network node or BTS operating in a different radio access technology network such as for example in a LTE and/or LTE-Advanced (LTE-A) network. As noted above these are non-limiting deployments. At block 502 the radio access network node configures a UE with a first configuration for reporting measurement feedback information according to a first reporting cycle using a first set of parameters, and with a second configuration for reporting measurement feedback information according to a second reporting cycle using a second set of parameters. Then at block 504 the radio access network node controls how often the UE reports measurement feedback information by sending to the UE downlink control signalling that directs the UE to switch between the first configuration and the second configuration. For the case the radio access network node is a RNC, it sends this downlink control signalling to the UE via one of the NodeBs that this RNC controls.

Some particulars from the above example for this third embodiment are summarized at block 506, where the downlink control signalling comprises a high-speed shared control channel (HS-SCCH) order commanding the UE to: switch to the first cycle; switch to the second cycle; or turn off the reporting of measurement feedback information.

The specific example above also gave proposed bit values for the three commands of block 506. For each, the HS-SCCH order comprises SCCH order type bits 0 1 0; and:
  the command to switch to the first cycle is indicated with SCCH order information bits 1 0 x;
  the command switch to the second cycle is indicated with SCCH order information bits 1 1 x; and
  the command to turn off the reporting of measurement feedback information is indicated with SCCH order information bits 0 0 x.

The process represented at FIG. 3 may be executed by the UE or by one or more components thereof, and the process represented at FIG. 5 may be executed by the network radio access node or by one or more components thereof. As non-limiting examples such components may include a processor and a memory storing executable software code, or a universal system identity module (USIM), or a modem, or a USB dongle, or a chipset, or an antenna module, or a radiofrequency RF module (RF front end), or any combination of these.

The logic diagrams of FIG. 3 and of FIG. 5 may each be considered to illustrate the operation of a method, and a result of execution of a computer program stored in a computer readable memory, and a specific manner in which components of an electronic device are configured to cause that electronic device to operate, whether such an electronic device is the UE or some other portable electronic device or component for the case of FIG. 3 or if it is a radio access network node or some type of BTS for the case of FIG. 5. FIG. 3 also implies the mirror processes for the NodeB or for the RNC (for example, configuring the UE with the first and second configurations) and similarly FIG. 5 implies the mirror processes for the UE (for example, receiving from the network access node the first and second configurations). The various blocks shown in FIG. 3 and separately in FIG. 5 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a user equipment/UE or a radio network access node, to perform the various functions summarized at FIGS. 3 and 5 and (c) circuits, such as a microprocessor(s) or a portion of a microprocessor(s), that require software or firmware for operation, even if the software or firmware is not physically present. This definition of 'circuitry' applies to all uses of this term in this specification, including in any claims. As a further example, as used in this specification, the term "circuitry" would also cover an implementation of merely a processor (or multiple processors) or portion of a processor and its (or their) accompanying software and/or firmware. The term "circuitry" also covers, for example, a baseband integrated circuit or application specific integrated circuit for a user equipment UE or a similar integrated circuit in a radio network that communicates wirelessly with one another.

Reference is now made to FIG. 6 for illustrating a simplified block diagram of various electronic devices and apparatus that are suitable for use in practicing the exemplary embodiments of this invention. In FIG. 6 a radio access network access node 22 is adapted for communication over a wireless link 21 with an apparatus, such as a mobile terminal or UE 20. The access node 22 may be any access node such as a NodeB or an eNodeB (including frequency selective repeaters and remote radio heads) of any wireless network, such as UTRAN, HSPA, WCDMA, GSM, GERAN, E-UTRAN/LTE, and the like. The operator network of which the access node 22 is a part may also include a network control element such as a radio network controller RNC in the case of a UTRAN and WCDMA network, or a mobility management entity MME for the case of LTE/LTE-Advanced networks in which case the MME may also serve as the serving gateway S-GW. This higher network entity 26 generally provides connectivity with the core cellular network and with further networks (e.g. a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, and communication means such as a transmitter TX 20D and a receiver RX 20E for bidirectional wireless communications with the access node 22 using the operative radio access technology. All of the relevant wireless communications are facilitated via one or more antennas 20F. Also stored in the MEM 20B at reference number 20G are the computer code or algorithms for the UE to decode and store its two CQI reporting configurations and the switching criteria or the bits of the HS-SCCH order that commands a switch, according to exemplary embodiments above.

The access node 22 also includes processing means such as at least one data processor (DP) 22A, storing means such as at least one computer-readable memory (MEM) 22B storing at least one computer program (PROG) 22C, and communication means such as a transmitter TX 22D and a receiver RX 22E for bidirectional wireless communications with the UE 20 via one or more antennas 22F. The access node 22 stores at block 22G in certain embodiments its own computer software code or algorithms to include two CQI reporting configurations with which the access node 22 configured the UE 20 as well as the switching criteria the UE uses (and the network access node includes in the RRC signalling to the UE) or the bits of the HS-SCCH order that the access node 22 uses to command a switch by the UE 20. In some radio technologies the access node 22 will have a direct data/control link 23 with other adjacent access nodes.

Also at FIG. 6 is shown a higher network entity 26 above the radio access node 22. In UTRAN (HSPA) and WCDMA this higher network entity 26 may be a radio network controller RNC, whereas in LTE/LTE-Advanced this entity 26 may be a MME and/or a S-GW as noted above. However implemented, the higher network entity 26 includes processing means such as at least one data processor (DP) 26A, storing means such as at least one computer-readable memory (MEM) 26B storing at least one computer program (PROG) 26C, and communication means such as a modem 26F for bidirectional communications with the access node 22, the UE 20 and with other access nodes under its control or coordination over the data and control link 27. In the UMTS radio access technology, the configuration for CQI reporting is provided to the UE by the RNC. While the NodeB engages in the actual wireless signalling with the UE, the CQI configurations typically are pass through messages and the decision as to what will be the CQI configuration for a given UE is made at the RNC.

While not particularly illustrated for the UE 20 or the access node 22, those devices are also assumed to include as part of their wireless communicating means a modem and/or a chipset and/or an antenna chip which may or may not be inbuilt onto a radiofrequency (RF) front end module within those devices 20, 22 and which also operates according to the teachings set forth above.

At least one of the PROGs 20C in the UE 20 is assumed to include a set of program instructions that, when executed by the associated DP 20A, enable the device to operate in accordance with the exemplary embodiments of this invention, as detailed above and particularly summarized at FIG. 3. The access node 22 and the higher network entity 26 also has software stored in its MEM 22B/26B to implement certain aspects of these teachings, as detailed above and particularly summarized at FIG. 5. In these regards, the exemplary embodiments of this invention may be implemented at least in part by computer software stored on the MEM 20B, 22B, 26B which is executable by the DP 20A of the UE 20 and/or by the DP 22A of the access node 22 and/or by the DP 26A of the higher network entity 26, or by hardware, or by a combination of tangibly stored software and hardware (and tangibly stored firmware) in any one or more of these devices 20, 22, 26. In this manner the respective DP with the MEM and stored PROG may be considered a data processing system. Electronic devices implementing these aspects of the invention need not be the entire devices as depicted at FIG. 6 or may be one or more components of same such as the above described tangibly stored software, hardware, firmware and DP, or a system-on-a-chip SOC or an application specific integrated circuit ASIC or a digital signal processor DSP or a modem or an antenna module or a RF front end module as noted above.

In general, the various embodiments of the UE 20 can include but are not limited to personal portable digital assistance devices having wireless communication capabilities, including but not limited to cellular and other mobile phones (including smart phones), navigation devices, laptop/palmtop/tablet computers, digital cameras and music devices, Internet appliances, USB dongles and data cards, machine-to-machine communication devices, and the like.

Various embodiments of the computer-readable MEMs 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the HSPA and WCDMA systems, as noted above the exemplary embodiments of this invention are not limited for use with only these particular types of wireless radio access technology networks.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for operating a user equipment, the method comprising:
   receiving at the user equipment from a radio network access node a first configuration for reporting measurement feedback information according to a first reporting cycle using a first set of parameters, and a second configuration for reporting measurement feedback information according to a second reporting cycle using a second set of parameters; and
   based on comparing a channel measurement of at least one channel parameter against a predefined threshold, switching between the first cycle and the second cycle for reporting measurement feedback information.

2. A method according to claim 1, wherein:
   the at least one channel parameters is volume of downlink data directed to the user equipment over a specified time interval, or number of times over a specified time interval that a measured channel quality changes from a previously reported channel quality by more than a threshold difference; or a channel quality indicator derived from measured channel quality;
   the switching is from the first cycle to the second cycle when the volume of downlink data or the number of times is less than the predefined threshold; and
   the switching is from the second cycle to the first cycle when the volume of downlink data or the number of times is more than the predefined threshold.

3. A method according to claim 2, wherein:
   the measurement feedback information comprises at least a channel quality indicator (CQI);
   an uplink control channel is a high-speed dedicated physical control channel (HS-DPCCH); and
   the downlink data directed to the user equipment is on a high-speed downlink shared channel (HS-DSCH).

4. A method according to claim 1, wherein:
   the comparing comprises comparing a volume of downlink data directed to the user equipment over a specified time interval against a predefined threshold;
   the second set of parameters comprises an inactivity CQI feedback cycle and an inactivity CQI repetition factor, wherein at least one of: the inactivity CQI feedback cycle parameter defines either a longer cycle than a feedback cycle parameter of the first set of parameters or no CQI feedback reporting; and
   the inactivity CQI repetition factor parameter defines a different number of repetitions than a repetition factor parameter of the first set of parameters.

5. A method according to claim 1, wherein:
   the at least one channel parameter is: number of times over a specified time interval that a measured channel quality changes from a previously reported channel quality by more than a threshold difference, or a channel quality indicator (CQI) derived from measured channel quality;
   the switching is from the first cycle to the second cycle when either the number of times or a value of the derived CQI is more than the predefined threshold or the number of times or the value of the derived CQI is less than the predefined threshold; and
   the second set of parameters are determined at the user equipment by applying a predetermined function to the first cycle, the predetermined function resulting in measurement feedback information being reported more frequently when the number of times or the value of the derived CQI is more than the predefined threshold and resulting in measurement feedback information being reported less frequently when the number of times or the value of the derived CQI is less than the predefined threshold.

6. A method according to claim 5, wherein the first cycle is a previously used channel quality indicator (CQI) feedback cycle, the second cycle is a new CQI feedback cycle having time interval k, and the predetermined function for switching from the previously used CQI feedback cycle to the new CQI feedback cycle is: New CQI feedback cycle, k=max (the previously used CQI feedback cycle, k/2, a configured minimum value of CQI feedback cycle).

7. A method according to claim 1, wherein:
the data or channel measurement is a channel quality indicator CQI derived from measured channel quality;
the second set of parameters are determined at the user equipment by applying a predetermined function to the first cycle, the predetermined function resulting in measurement feedback information being reported more frequently when the CQI is outside a range, and resulting in measurement feedback information being reported less frequently when the CQI is inside the range, where the range is a function of a previously reported channel quality indication.

8. A method according to claim 7, wherein the predetermined function resulting in measurement feedback information being reported more frequently when the CQI is outside the range is: New CQI feedback cycle, k=max (the previously used CQI feedback cycle, k/2, a configured minimum value of CQI feedback cycle).

9. A method according to claim 1, wherein:
the at least one channel parameter is a channel quality indicator (CQI) derived from measured channel quality;
the second reporting cycle is event-based;
the comparing comprises comparing the CQI derived from the measured channel quality against a threshold CQI value or a threshold CQI range; and
the switching is from only the first cycle to the second cycle and the event-based second cycle when the derived CQI exceeds the threshold CQI or is outside the threshold CQI range.

10. An apparatus for operating a user equipment comprising:
circuitry configured to
receive from a radio network access node a first configuration for reporting measurement feedback information according to a first reporting cycle using a first set of parameters, and a second configuration for reporting measurement feedback information according to a second reporting cycle using a second set of parameters; and
based on comparing a channel measurement of at least one channel parameter against a predefined threshold, switch between the first cycle and the second cycle for reporting measurement feedback information.

11. The apparatus according to claim 10, wherein the at least one channel parameter is volume of downlink data directed to the user equipment over a specified time interval, or number of times over a specified time interval that a measured channel quality changes from a previously reported channel quality by more than a threshold difference; or a channel quality indicator derived from measured channel quality;
the switching is from the first cycle to the second cycle when the volume of downlink data or the number of times is less than the predefined threshold; and
the switching is from the second cycle to the first cycle when the volume of downlink data or the number of times is more than the predefined threshold.

12. The apparatus according to claim 11, wherein:
the measurement feedback information comprises at least a channel quality indicator (CQI);
an uplink control channel is a high-speed dedicated physical control channel (HS-DPCCH); and
the downlink data directed to the user equipment is on a high-speed downlink shared channel (HS-DSCH).

13. The apparatus according to claim 10, wherein:
the comparing comprises comparing a volume of downlink data directed to the user equipment over a specified time interval against a predefined threshold;
the second set of parameters comprises an inactivity CQI feedback cycle and an inactivity CQI repetition factor, wherein at least one of:
the inactivity CQI feedback cycle parameter defines either a longer cycle than a feedback cycle parameter of the first set of parameters or no CQI feedback reporting; and
the inactivity CQI repetition factor parameter defines a different number of repetitions than a repetition factor parameter of the first set of parameters.

14. The apparatus according to claim 10, wherein:
the at least one channel parameter is number of times over a specified time interval that a measured channel quality changes from a previously reported channel quality by more than a threshold difference, or a channel quality indicator (CQI) derived from measured channel quality;
the switching is from the first cycle to the second cycle when either the number of times or a value of the derived CQI is more than the predefined threshold, or the number of times or a value of the derived CQI is less than the predefined threshold; and
the second set of parameters are determined at the user equipment by applying a predetermined function to the first cycle, the predetermined function resulting in measurement feedback information being reported more frequently when the number of times or the value of the derived CQI is more than the predefined threshold and resulting in measurement feedback information being reported less frequently when the number of times or the value of the derived CQI is less than the predefined threshold.

15. The apparatus according to claim 14, wherein the first cycle is a previously used channel quality indicator (CQI) feedback cycle, the second cycle is a new CQI feedback cycle having time interval k, and the predetermined function for switching from the previously used CQI feedback cycle to the new CQI feedback cycle is: New CQI feedback cycle, k=max (the previously used CQI feedback cycle, k/2, a configured minimum value of CQI feedback cycle).

16. The apparatus according to claim 10, wherein:
the at least one channel parameter is a channel quality indicator CQI derived from measured channel quality; and
the second set of parameters are determined at the user equipment by applying a predetermined function to the first cycle, the predetermined function resulting in measurement feedback information being reported more frequently when the CQI is outside a range, and resulting in measurement feedback information being reported less frequently when the CQI is inside the range, where the range is a function of a previously reported channel quality indication.

17. The apparatus according to claim 16, wherein the predetermined function resulting in measurement feedback information being reported more frequently when the CQI is outside the range is: New CQI feedback cycle, k=max (the previously used CQI feedback cycle, k/2, a configured minimum value of CQI feedback cycle).

18. The apparatus according to claim 16, wherein the predetermined function resulting in measurement feedback information being reported less frequently when the CQI is inside the range is: New CQI feedback cycle, k=min (the previously used CQI feedback cycle, k.times.2, a configured maximum value of CQI feedback cycle).

19. The apparatus according to claim 10, wherein:
the at least one channel parameter is a channel quality indicator (CQI) derived from measured channel quality;
the second reporting cycle is event-based;
the comparing comprises comparing the CQI derived from the measured channel quality against a threshold CQI value or a threshold CQI range; and
the switching is from only the first cycle to the second cycle and the event-based second cycle when the derived CQI exceeds the threshold CQI or is outside the threshold CQI range.

20. A non-transitory computer-readable medium encoded with computer-readable instructions that, when executed by a processor of a user device, cause the processor to perform a method comprising:
receiving at the user equipment from a radio network access node a first configuration for reporting measurement feedback information according to a first reporting cycle using a first set of parameters, and a second configuration for reporting measurement feedback information according to a second reporting cycle using a second set of parameters; and
switching, based on comparing a channel measurement of at least one channel parameter against a predefined threshold, between the first cycle and the second cycle for reporting measurement feedback information.

* * * * *

UNITED STATES PATENT AND TRADEMARK OFFICE
CERTIFICATE OF CORRECTION

| | | |
|---|---|---|
| PATENT NO. | : 9,439,088 B2 | Page 1 of 1 |
| APPLICATION NO. | : 14/273086 | |
| DATED | : September 6, 2016 | |
| INVENTOR(S) | : Keiichi Kubota et al. | |

It is certified that error appears in the above-identified patent and that said Letters Patent is hereby corrected as shown below:

On the Title Page

Item (72), the Inventor's information is incorrect. Item (72) should read:
--(72) Inventors: Keiichi Kubota, Weybridge (GB);
　　　　　　　　Brian Alexander Martin, Farnham (GB);
　　　　　　　　Himanshu Kumar, Fleet (GB)--

Signed and Sealed this
Thirteenth Day of March, 2018

Andrei Iancu
*Director of the United States Patent and Trademark Office*